United States Patent
Wendzel

(10) Patent No.: US 10,565,115 B2
(45) Date of Patent: Feb. 18, 2020

(54) CALCULATING THE OPTIMAL NUMBER OF LBNS TO PREFETCH PER CPU

(71) Applicant: Western Digital Technologies, Inc., San Jose, CA (US)

(72) Inventor: Kevin James Wendzel, Rochester, MN (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 141 days.

(21) Appl. No.: 15/474,340

(22) Filed: Mar. 30, 2017

(65) Prior Publication Data
US 2018/0285273 A1   Oct. 4, 2018

(51) Int. Cl.
   *G06F 12/0862*   (2016.01)
(52) U.S. Cl.
   CPC .... *G06F 12/0862* (2013.01); *G06F 2212/602* (2013.01); *G06F 2212/6026* (2013.01); *G06F 2212/7201* (2013.01)
(58) Field of Classification Search
   CPC ............. G06F 12/0862; G06F 12/0868; G06F 2212/602; G06F 2212/6026; G06F 2212/7201
   See application file for complete search history.

(56) References Cited

U.S. PATENT DOCUMENTS

| | | | | |
|---|---|---|---|---|
| 2005/0120169 A1* | 6/2005 | Hirako | ..................... | G06F 3/061 711/112 |
| 2013/0132674 A1* | 5/2013 | Sundrani | ............. | G06F 12/0804 711/122 |
| 2015/0277764 A1* | 10/2015 | Ehrlich | ................. | G06F 3/0616 711/103 |
| 2016/0342521 A1* | 11/2016 | Richmond | .......... | G06F 12/0811 |

* cited by examiner

*Primary Examiner* — Aracelis Ruiz
(74) *Attorney, Agent, or Firm* — Patterson & Sheridan, LLP; Steven H. Versteeg

(57) ABSTRACT

The present disclosure generally relates to prefetching data from one or more CPUs prior to the data being requested by a host device. The prefetched data is prefetched from memory and stored in cache. If a host device requests data that is not already in cache, then a determination is made regarding whether the data is scheduled to be written into cache. If the data is not in cache and is not scheduled to be written into cache, then the data is retrieved from memory and delivered to the host device. If the data is scheduled to be written into cache, or is currently being written into cache, then the request to retrieve the data is delayed or scheduled to retrieve the data once the data is in cache. If the data is already in cache, the data is delivered to the host device.

7 Claims, 5 Drawing Sheets

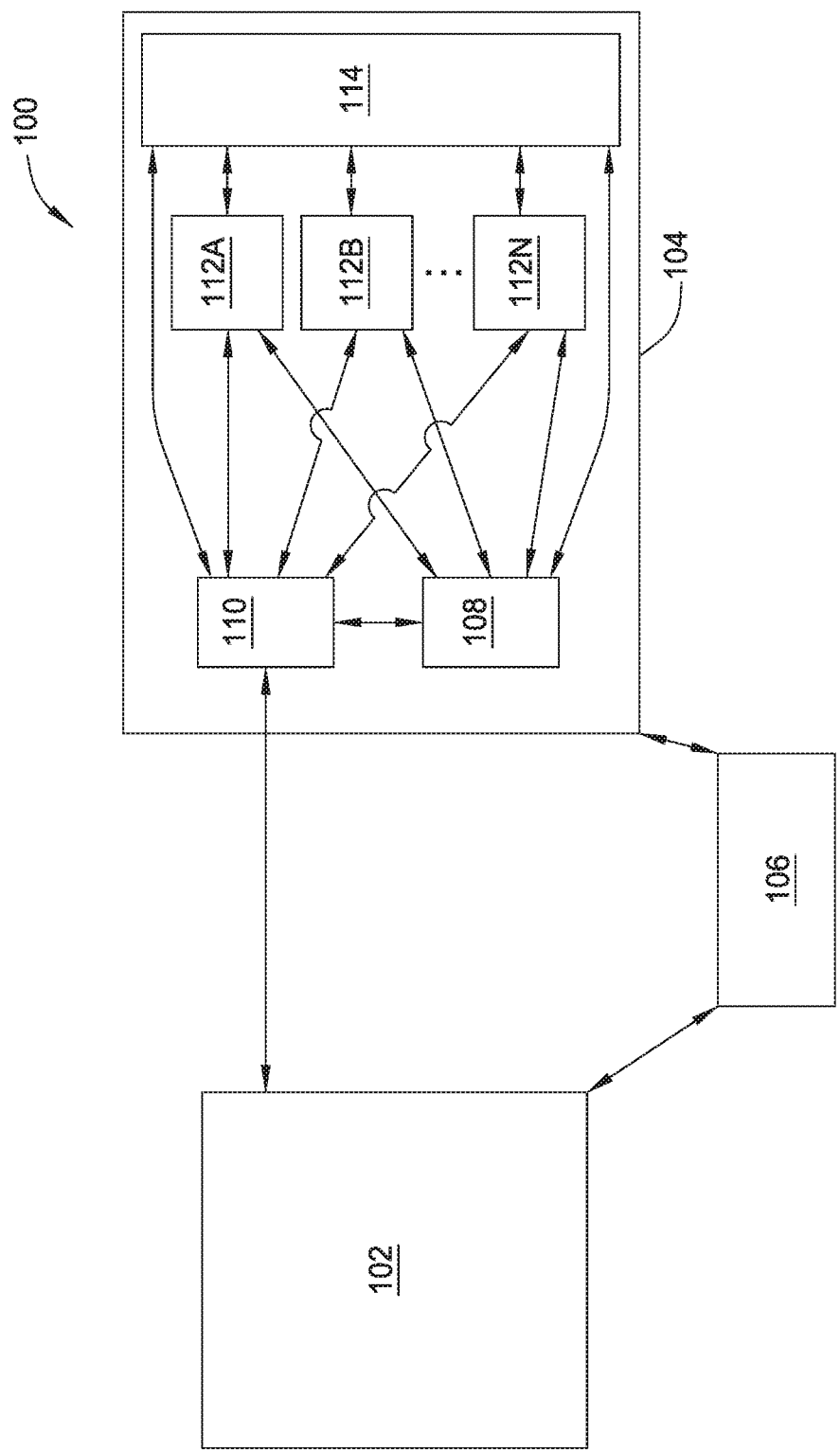

CALCULATING THE OPTIMAL NUMBER OF LBNS TO PREFETCH PER CPU

BACKGROUND OF THE DISCLOSURE

Field of the Disclosure

Embodiments of the present disclosure generally relate to a method and apparatus for prefetching data into cache memory prior to receiving a request for the data from a host device.

Description of the Related Art

In a multiprocessor hard drive or SSD environment, multiple processors are used to simultaneously prefetch data needed for expected future reads by the host into memory. To do so, a "master" processor may assign which processors will prefetch desired ranges so that multiple processors are not reading the same data from the disk or NAND, which would result in unresolvable collisions if allowed. Alternatively, the different processors may be hardcoded with different ranges in the firmware code.

The data is typically read from the disk or NAND at the LBN granularity. However, the host can request the data to be read at the LBA granularity, which is a subset of the LBN. Due to this, it is possible that the host, in a single command, will request data that overlaps the prefetch range of two different processors, which is not optimal as additional overhead will be needed to move all of the data to one processor before the data is returned to the host.

As an example, if the prefetching engine predicts that the host is sending commands sequentially with a length of 6 LBNs, two different processors may have LBNs prefetched with the first processor having LBNs 1-3 and the second processor having LBNs 4-6. LBNs 1-3 have LBAs 1-299 while LBNs 4-6 have LBAs 300-599. If the host device starts reading at LBA 275 and reads sequentially for one LBN, then the host will attempt to read LBAs 275-325. However, these LBAs span LBNs 3 and 4, which will cause an issue because the LBNs are cached on two different processors.

Therefore, there is a need in the art to prefetch data in a more efficient manner.

SUMMARY OF THE DISCLOSURE

The present disclosure generally relates to prefetching data from one or more CPUs prior to the data being requested by a host device. The prefetched data is prefetched from memory and stored in cache. If a host device requests data that is not already in cache, then a determination is made regarding whether the data is scheduled to be written into cache. If the data is not in cache and is not scheduled to be written into cache, then the data is retrieved from memory and delivered to the host device. If the data is scheduled to be written into cache, or is currently being written into cache, then the request to retrieve the data is delayed or scheduled to retrieve the data once the data is in cache. If the data is already in cache, the data is delivered to the host device. It is to be understood that while the examples disclosed herein are in reference to NAND memory, the embodiments herein are equally applicable to hard disk drive (HDD) storage as well.

In one embodiment, a system comprises a host device and a memory system coupled to the host device. The memory system comprises: a first CPU; at least one additional CPU; and a memory device coupled to both the first CPU and the at least one additional CPU. The system also comprises means to determine an amount of LBNs to prefetch and to cause the amount of LBNs to be prefetched and written into cache.

In another embodiment, a method comprises receiving a first request from a host device to read first data and a second request to read second data from a memory device that is coupled to a plurality of CPUs, wherein a first CPU of the plurality of CPUs has a cache storage; reading the first data from the memory device using the first CPU; reading the second data from the memory device using a second CPU of the plurality of CPUs; writing the first data and the second data to the cache storage; reading the first and second data from the cache storage; and delivering the first and second data to the host device.

In another embodiment, a method comprises receiving a first request from a host device to read first LBA data from a plurality of LBNs disposed in a memory device that is coupled to a plurality of CPUs, wherein a first CPU of the plurality of CPUs has a cache storage; reading a first portion of the first LBA data from one or more first LBNs of the memory device; reading a second portion of the first LBA data from one or more second LBNs of the memory device; writing the one or more first LBNs data and the one or more second LBNs data to the cache storage; reading the first LBA data from the cache storage; and delivering the first LBA data to the host device.

In another embodiment, a method comprises prefetching and storing a first predetermined number of LBNs in a cache of a first CPU; reading data from the cache; delivering the data to a host device; and prefetching and storing a second number of LBNs into the cache, wherein the retrieving and storing occurs prior to receiving a request from the host device to read the data.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 1 is a schematic illustration of a system according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 2A:
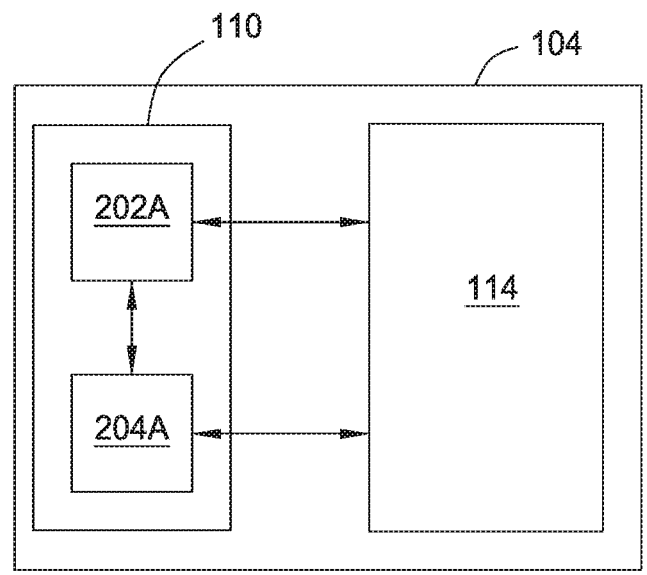
FIGS. 2A and 2B are schematic illustrations of CPUs of the system of FIG. 1.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s). It is to be understood that while reference will be made to NAND or hard disk drives, the disclosure is equally applicable to other types of no-volatile memory as well.

The present disclosure generally relates to prefetching data from one or more CPUs prior to the data being requested by a host device. The prefetched data is prefetched from memory and stored in cache. If a host device requests data that is not already in cache, then a determination is made regarding whether the data is scheduled to be written into cache. If the data is not in cache and is not scheduled to be written into cache, then the data is retrieved from memory and delivered to the host device. If the data is scheduled to be written into cache, or is currently being written into cache, then the request to retrieve the data is delayed or scheduled to retrieve the data once the data is in cache. If the data is already in cache, the data is delivered to the host device.

FIG. 1 is a schematic illustration of a system 100 according to one embodiment. The system includes a host device 102 that interacts with a memory system 104. A controller 106 coupled to both the host device 102 and the memory system 104. The memory system stores data that may be needed by the host device 102 at various times. When the data is needed, the host device 102 contacts the memory system 104 to obtain the data. The controller 106 controls the communication between the memory system 104 and the host device 102.

The memory system 104 includes a memory controller 108 and multiple CPUs. A first or main CPU 110 is present as are one or more additional CPUs 112A-112N. The first CPU 110 is the main CPU for interacting with the host device 102 as will be discussed below. The memory system 104 also includes a memory device 114. The memory device 114 is coupled to all of the CPUs 110, 112A-112N as well as the memory controller 108. In one embodiment, the memory device 114 is a NAND storage device. In another embodiment, the memory device 114 is a HDD storage device. It is to be understood that the memory device 114 is not to be limited to either a NAND storage device or a HDD storage device. Rather, the memory device 114 is applicable to any storage device capable of storing data that may be retrieved by one or more CPUs.

Figure 2B:
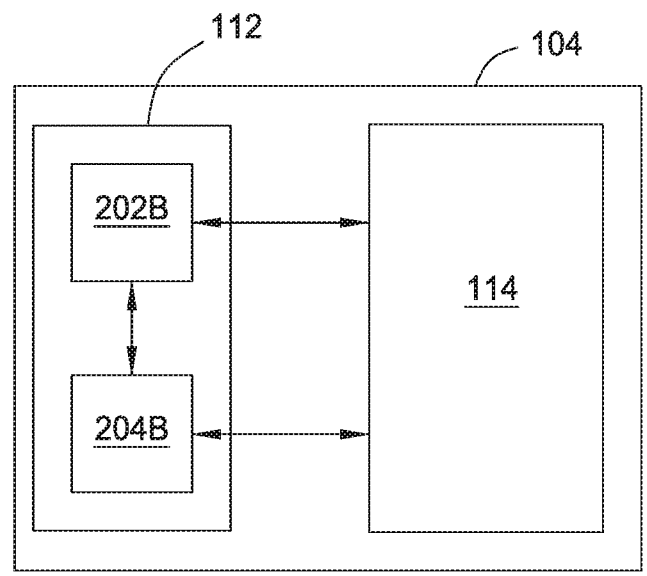

FIGS. 2A and 2B are schematic illustrations of CPUs of the system 100 of FIG. 1. In FIG. 2A, the first CPU 110 is shown to have a controller 202A that interacts with both a cache storage 204A and the memory device 114. Similarly, in FIG. 2B, the other CPUs 112A-112N represented by CPU 112 all have a controller 202B that interacts with both a cache storage 204B and the memory device 114.

The controllers 106, 202A, 202B are digital circuits that manage the flow of data going to and from the memory system 104 (in the case of controller 106) and to and from an individual CPU 110, 112A-112N (in the case of controllers 202A, 202B). The controllers 106, 202A, 202B can be separate chips or integrated into other chips, such as being placed on the same die or as an integral part of a CPU (as in the case of controllers 202A, 202B). Controllers 106, 202A, 202B may be referred to as integrated memory controllers (MC), a memory chip controller (MCC) or a memory controller unit (MCU). Additionally, the controllers 106, 202A, 202B function to determine an amount of LBNs to prefetch and to cause the amount of LBNs to be prefetched and written into cache. Controller 202A also is able to receive a request from the host device 102 and prefetch LBNs from at least one additional CPU 112A-112N. Controllers 202B are able to send prefetched LBNs to the first or main CPU 110. Controller 202A is able to receive the prefetched LBNs from controllers 202B.

In order to obtain the desired data at the host device 102 from the memory system 104, a prefetching algorithm is utilized. The algorithm uses as much of the memory reserved for read caching as possible. The more reads that can be serviced from a single processor, the more time other processors have to refill their read cache before they need to service reads again. The algorithm tries to have a contiguous range of LBNs prefetched across all CPUs. If there is an LBN that is not prefetched, the host command that needs to use the LBN will be slowed down significantly waiting to read that single LBN from NAND or a disk compared to reading all the data from the cache. The algorithm avoids the issue of a single LBN that is needed by different commands targeted at different processors.

To understand the algorithm, a few labels will now be explained. MaxReadLBNsInCache is a constant representing the maximum number of LBNs that can be stored in the cache of a single processor. NumLBAsPerLBN is a constant representing the number of LBAs in an LBN. LastLBAPrefetched is the last LBA prefetched on any processor. If no LBAs have been prefetched yet, then LastLBAPrefetched is the last LBA read by the host device. CmdLen is the number of LBAs prefetched to be read by each sequential read request the host device is expected to make. In all cases, the first LBN to prefetch (FirstLBNToPrefetch) on a specific processor is the next LBN following the LastLBAPrefetched.

If the next LBA to prefetch starts at an LBN boundary, then the calculation is relatively easy. The minimum number of LBNs that can be added to cache and still allow all commands to be serviced from a single processor (MinLBNsToAddToCache) is simply the least common multiple of CmdLen and NumLBAsPerLBN divided by NumLBAsPerLBN. The total number of LBNs that should be cached is the largest multiple of MinLBNsToAddToCache that is less than or equal to MaxReadLBNsInCache.

Figure 3:
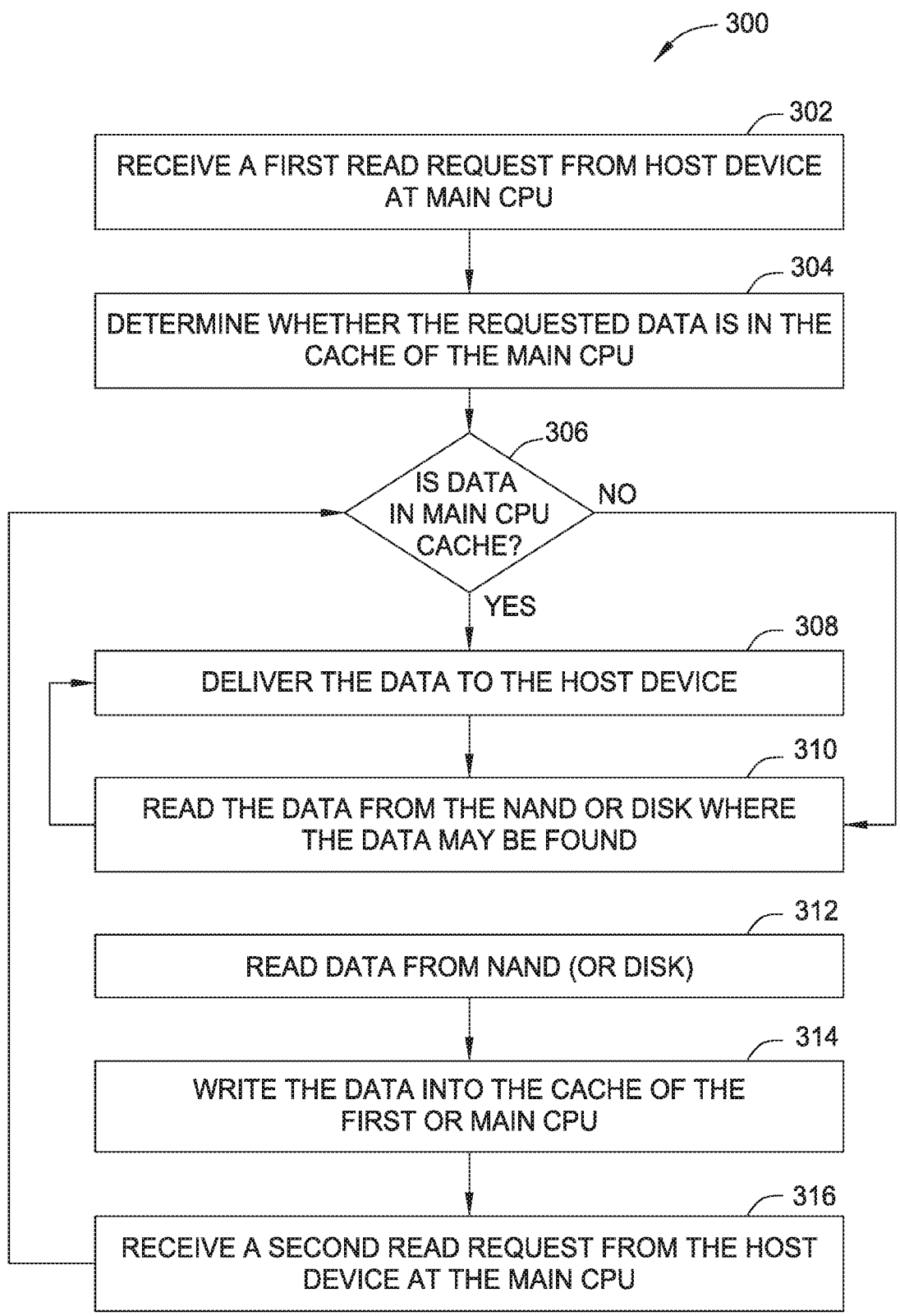
FIG. 3 is a flowchart illustrating a method according to one embodiment.

FIG. 3 is a flowchart illustrating a method 300 according to one embodiment. In the method, the host device 102 initially sends a read request to the memory device 104. Specifically, the read request is received by the first or main CPU 110 in block 302. The read request is for data contained in specific LBAs that are contained in one or more LBNs. A determination is made as to whether the requested data is already present in cache. More specifically, a determination is made as to whether the requested data is in the cache of the first or main CPU 110 in block 304. If the requested data is in the cache of the first or main CPU 110 as shown by the yes determination in block 306, then the data is delivered to the host device 102 in block 308. If the data is not in the cache of the first or main CPU 110 as shown by the no determination in block 306, then the data is read from appropriate NAND (or disk in the case of a disk system) in block 310.

Starting at time zero, there will be no data in cache and thus, the initial read request from the host device will necessitate reading the data from NAND (or disk), which takes time. During (or even after) the read request processing, non-requested data can begin to be read from NAND (or disk) block 312 and stored into cache. The read data is sent to the cache of the first or main CPU 110 in block 314 if the data is not already in the first or main CPU 110 NAND (or disk). The non-requested data is prefetched data that is predicted to be used based upon the algorithm discussed above. After sufficient iterations, sufficient data will be in the first or main CPU 110 cache so that the read latency will be reduced over the situation of reading the data directly from NAND (or disk) or from multiple caches.

If the data is considered in portions (i.e., LBAs of LBNs), then in general, after the first read request is received, a second request is received from the host device to read second LBA data in block 316. For the second request, a first portion of the second LBA data is disposed in a first LBN and a second portion of the second LBA data is disposed in a second LBN. The first portion and the second portion are read from the memory device 114. The LBN containing the first portion and the LBN from the second portion are written to the cache 204A. The data is then read from the cache 204A and delivered to the host device 102. Additional requests can be handled in a similar manner with the goal of having all of the requested data already in the cache 204A by the time the host device 102 makes the request. For the second read request, ideally, the reading from memory device 114 and writing to cache 204A will occur prior to receiving the read request.

Figure 4:
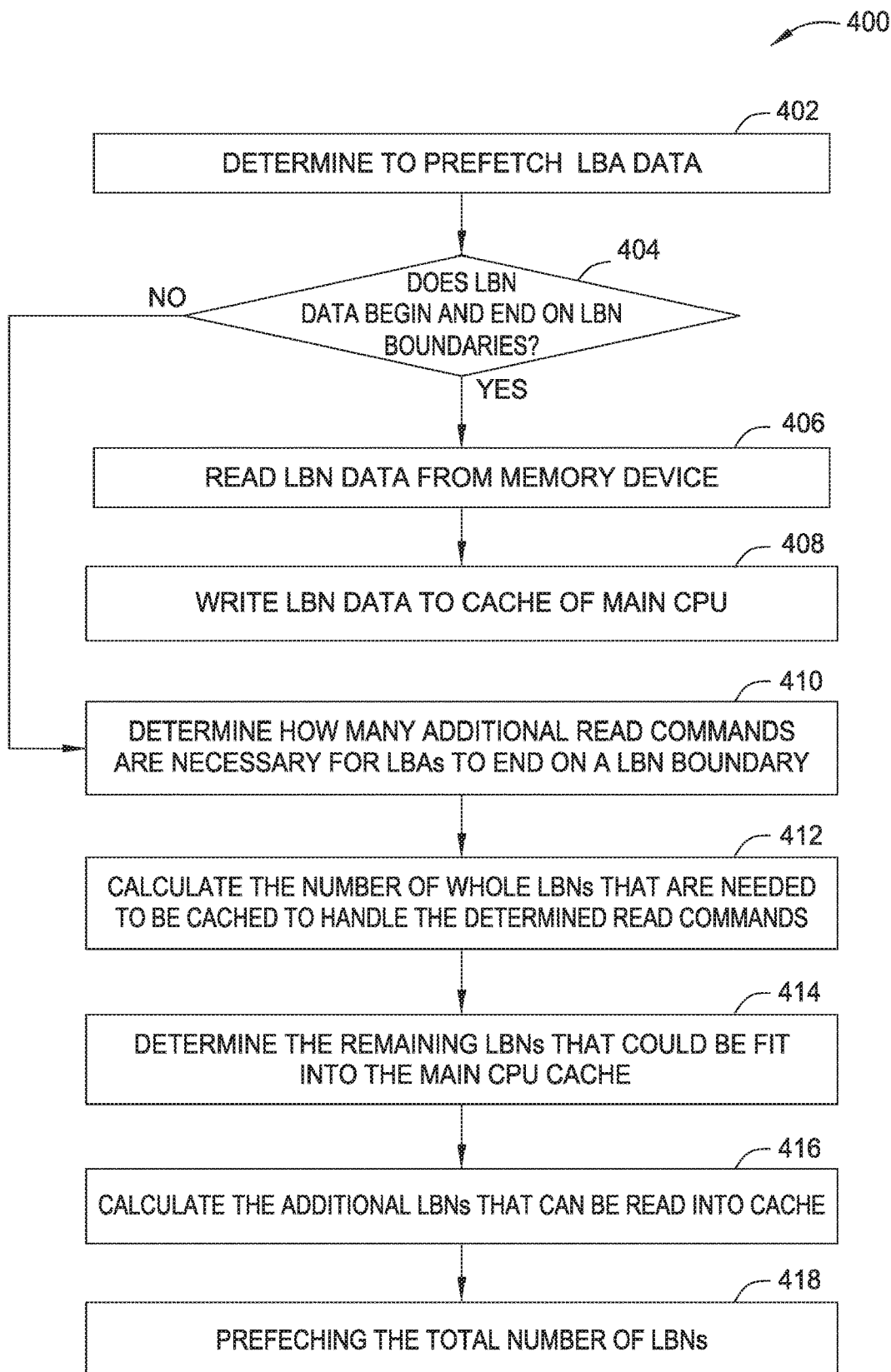
FIG. 4 is a flowchart illustrating a method according to another embodiment.

FIG. 4 is a flowchart illustrating a method 400 according to another embodiment. In the method of FIG. 4, a determination is initially made to prefetch data in block 402. A determination is then made in block 404 regarding whether the LBA data to be prefetched begins and ends on an LBN boundary. If the answer is yes, then the LBN data is read from the memory device 114 in block 406, written to the cache of the main CPU 110 in block 408.

If the next LBA to prefetch does not start at an LBN boundary (i.e., the answer is "no" in block 404), the calculation is more difficult. First, a determination is made regarding how many additional read commands are necessary before the read command ended on an LBN boundary (NumCmdsToLBNBoundary) in block 410. The number of whole LBNs that are needed to be cached to handle the number of commands (InitLBNToCache) is calculated in block 412. From there, InitLBNToCache is subtracted from the number of MaxReadLBNsInCache to determine the remaining LBNs that could be fit into cache (FreeLBNsInCache) in block 414. Replacing MaxReadLBNsInCache with MaxRemainingReadLBNsInCache from above, the algorithm can be used to calculate how many additional LBNs can be read into cache (AdditionalLBNsInCache) in block 416. The total number of LBNs to prefetch is the sum of NumWholeLBNsToReachLBNBoundary and NumAdditionalLBNsInCache and is finally prefetched in block 418.

In some cases, it is possible that there is no value for MinLBAsToAddToCache that is small enough to fit in cache. The simplest example is a sequential read that is always NumLBAsPerLBN long but does not start at an LBN boundary. In these cases, it is impossible to avoid the situation where some specific LBN will need to be read by multiple processors, and a best case effort will need to be made instead. In this case, the total number of LBNs to prefetch is the number of whole commands that can be serviced without going over the maximum size of the read cache.

The algorithm can be easily distilled into the following equations:

$$FirstLBNtoPrefetch = LastLBAPrefetched/(NumLBAsPerLBN+1).$$

$$MinLBNsToAddToCache\ LCM(CmdLEN, NumLBAsPerLBN)/NumLBAsPerLBN.$$

$$NextLBAToPrefetch = LastLBAPrefetched+1.$$

If (NextLBAToPrefetch)mod NumLBAsPerLBN=0, then NumLBNsToCache=MaxReadLBNsInCache round down to the nearest multiple of MinLBNsToAddToCache else solve ((NextLBAToPrefetch+NumCmdsToLBNBoundary*CmdLen) mod NumLBAsPerLBN=0 for NumCmdsToLBNBoundary.

$$InitLBNsToCache = NumCmdsToLBNBoundary*CmdLen/NumLBAsPerLBN.$$

$$FreeLBNsInCache = MaxReadLBNsInCache - InitLBNsToCache.$$

AdditionalLBNsToCache=FreeLBNsInCache rounded down to the nearest multiple of MinLBNsToAddToCache.

$$NumLBNsToCache = InitLBNsToCache + AdditionalLBNsToCache.$$

If NumLBNsToCache=0, then LeadingLBAsNotInCache FirstLBNToPrefetch/(NumLBAsPerLBN−NextLBAToPrefetch).

$$NumCmdsFromCache = (MaxReadLBNsInCache*(NumLBAsPerLBN+LeadingLBAsNotInCache))/CmdLen.$$

$$NumLBNsToCache = (NumCmdsFromCache*(CmdLen-LeadingLBAsNotInCache))/NumLBAsPerLBN.$$

LastLBAPrefetched=NumCmdsFromCache*CmdLen else LastLBAPrefetched=(FirstLBNToPrefetch+NumLBNsToCache)*NumLBAsPerLBN−1.

When prefetching data from NAND or disk, it is possible that the expected host command to read that data starts being processed before the prefetch is complete and the data has been added to the read cache. In this situation, if the host command is continued as normal, the data will not be found in cache and will be treated as a normal read. This creates two problems. First, the drive spent unnecessary time prefetching data from NAND or disk that will eventually get thrown away. Second, depending on how far along the prefetch command processing is, there may be a read collision between the prefetch command and the host command which will cause additional overhead for the hose command. A potential solution to the problem is, during host read processing, if the drive detects a prefetch command for the same LBN as in the host read is in process, it stalls processing the host command until the prefetch command completes. This is not preferable however, as there may be subsequent LBNs in the same host command that are not in or pending to be added to the read cache. If the host command is not stalled, reads on LBNs not scheduled to be prefetched can be executed in parallel with the prefetch commands, which results in an overall faster execution time for the host command.

Figure 5:
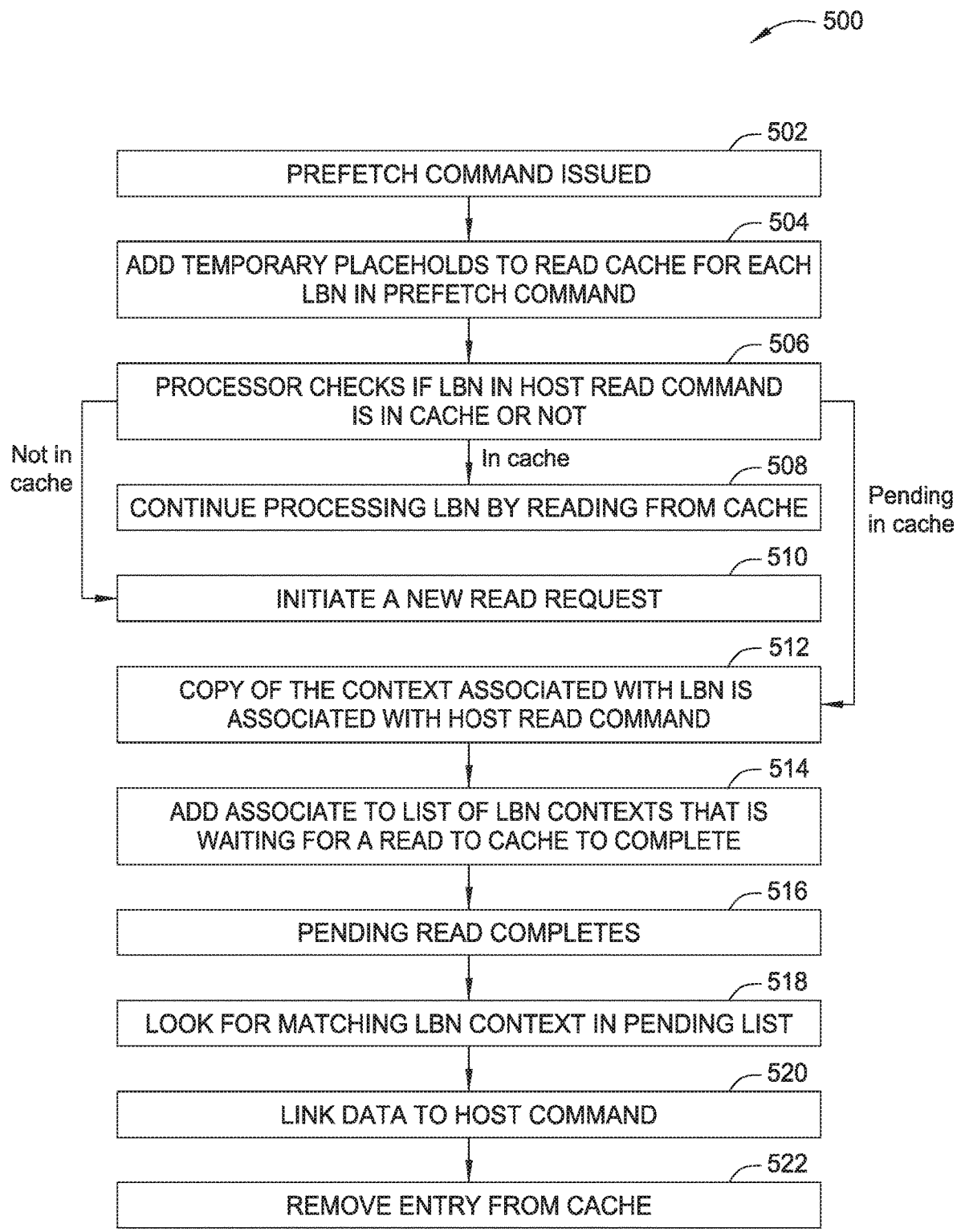
FIG. 5 is a flowchart illustrating a method according to another embodiment.

Reserving space in the cache for a pending read to cache operation to prevent a subsequent host read request from reading the same LBN, while allowing subsequent LBN reads as part of the same host read request will now be discussed with regards to the method 500 shown in FIG. 5.

When a prefetch command is first issued in block 502, temporary placeholds are added to the read cache for each LBN in the prefetch command indicating that the read to cache is pending in block 504. When a host read command that was anticipated by the prefetching engine starts being processed, for each LBN in the command, the processor checks if the LBN is in cache or not in block 506 to determine if the LBN is in cache, not in cache, or pending in cache. If the LBN has already completed being read into cache, the processor continues processing the LBN as if the LBN had just been read from NAND or disk in block 508. If the LBN is not in cache, the processor initiates a new read request from NAND or disk for that LBN in block 510. If the processor finds that the LBN read to cache is pending, then a copy of the context associated with the LBN is associated with the host read command in block 512 and added to a list of LBN contexts that is waiting for a read to cache to complete in block 514. This processing continues until all LBNs in the host command have been processed or a new read from NAND or disk being issued due to the LBN not found in cache.

When a pending read to cache completes for a given LBN in block 516, the processor will look for a matching LBN context in the pending list in block 518. If a match is found, the data is linked to the host command in block 520, the host command is continued as if the LBN had just been read from NAND or disk, and the entry is removed from cache in block 522. If no match is found, the LBN data is left in cache waiting for a host command to read it.

One problem that can result from the algorithm is the issue of LBNs in collision. Specifically, there are two issues that can occur. The first is that an LBN being prefetched into cache detects a collision and a host command is currently waiting for that LBN. The second is an LBN being read from NAND by the host command has read subsequent LBNs in from cache. In both of these cases, there is a possibility of deadlock between the command that holds the lock for the LBN in collision and any locks this host command holds for subsequent LBNs. The processor needs to iterate through all subsequent LBNs in this host command and release them. Once the collision on the current LBN is resolved, the subsequent LBNs can be re-requested.

Overall, by prefetching LBNs, which contain LBAs, and storing the data into cache of a single processor will reduce the read latency for a read request from a host device. Caching LBN data into cache of a single processor reduces any need to read data from NAND or from additional processors upon receiving the read request. As a result, the latency is only between receiving the read request from the host device and delivering the read from cache in a single processor. The prefetching may occur by obtaining the LBNs from a single CPU or multiple CPUs and storing the prefetched data in a single CPU in the single CPU's cache. Alternatively, the prefetching may occur by obtaining the LBNs from multiple CPUs and consolidating (by storing) all of the prefetched data on a single CPU in the single CPU's cache.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
receiving a first request from a host device to read a first data and a second request to read a second data from a memory device that is coupled to a plurality of CPUs, wherein a first CPU of the plurality of CPUs has a first cache storage and a second CPU of the plurality of CPUs has a second cache storage;
reading the first data from the memory device using the first CPU;
reading the second data from the memory device using the second CPU of the plurality of CPUs;
writing the first data and the second data to the first cache storage of the first CPU;
reading the first and second data from the first cache storage; and
delivering the first and second data to the host device.

2. The method of claim 1, wherein the memory device is a NAND storage device.

3. The method of claim 1, wherein the memory device is a hard disk drive storage device.

4. A method, comprising:
receiving a first request from a host device to read a first LBA data from a a first LBN and a second LBN disposed in a memory device that is coupled to a first CPU and a second CPU, wherein the first CPU has a first cache storage and is assigned the first LBN, wherein the second CPU has a second cache storage and is assigned the second LBN;
reading a first portion of the first LBA data from the first LBN of the memory device;
reading a second portion of the first LBA data from the second LBN of the memory device;
writing the first portion of the first LBN data and the second portion of the first LBN data to the first cache storage;
reading the first LBA data from the first cache storage; and
delivering the first LBA data to the host device.

5. The method of claim 4, further comprising:
receiving a second request from the host device to read a second LBA data from the memory device, wherein the first LBA data and the second LBA data are sequential data;
reading the second LBA data from the memory device;
writing the second LBA data to the first cache storage; and
delivering the second LBA data to the host device.

6. The method of claim 5, wherein the writing the second LBA data to the first cache storage occurs prior to receiving the second request.

7. The method of claim 4, wherein the reading the first portion of the first LBA data is performed by the first CPU and reading the second portion of the first LBA data is performed by the second CPU.

* * * * *